United States Patent
Padmanabhan et al.

(10) Patent No.: US 9,058,425 B2
(45) Date of Patent: Jun. 16, 2015

(54) SOFTWARE METRICS ASSESSMENT SYSTEM

(71) Applicant: Bank of America Corporation, Charlotte, NC (US)

(72) Inventors: Bharani Shangar Padmanabhan, Concord, CA (US); Deepan Raja Sachithanandam, Coimbatore (IN); Rathi Kaliyan, Chennai (IN); Vijayakumar Gurusamy Raju, Chennai (IN); Bhargava Srivathsan Gopalakrishnan, Thanjavur (IN); Vimal Vijayasekaran, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 115 days.

(21) Appl. No.: 14/078,801

(22) Filed: Nov. 13, 2013

(65) Prior Publication Data

US 2015/0135168 A1    May 14, 2015

(51) Int. Cl.
*G06F 9/44* (2006.01)
*G06F 11/36* (2006.01)
*G06F 17/30* (2006.01)

(52) U.S. Cl.
CPC ........ *G06F 11/368* (2013.01); *G06F 17/30424* (2013.01)

(58) Field of Classification Search
None
See application file for complete search history.

(56) References Cited

U.S. PATENT DOCUMENTS

| 8,549,522 | B1 * | 10/2013 | Chatterjee et al. | 718/102 |
| 2003/0115323 | A1 * | 6/2003 | Nam | 709/224 |
| 2006/0075303 | A1 * | 4/2006 | Ulrich et al. | 714/38 |
| 2008/0040312 | A1 * | 2/2008 | Kolz et al. | 707/2 |
| 2008/0229284 | A1 * | 9/2008 | Castro et al. | 717/124 |

* cited by examiner

*Primary Examiner* — Don Wong
*Assistant Examiner* — Daxin Wu
(74) *Attorney, Agent, or Firm* — Michael A. Springs

(57) ABSTRACT

An apparatus of one embodiment evaluates a software change and includes an interface, a memory, and a processor. The interface is operable to communicate through a network with a mainframe and a database. The memory is operable to store metrics information. The processor is operable to determine that a job has executed on the mainframe, the job including a program on the mainframe that utilizes the software change and causes first database queries to be sent from the mainframe to the database. The processor is also operable to send a message identifying the job to the mainframe, receive job information associated with the first database queries from the mainframe, generate second database queries based on the job information, send the second database queries to the database, receive metrics associated with the first database queries, and determine whether the metrics information meets one or more compliance standards.

20 Claims, 3 Drawing Sheets

SOFTWARE METRICS ASSESSMENT SYSTEM

TECHNICAL FIELD OF THE INVENTION

The present invention relates generally to the field of software development and more particularly to a software metrics assessment system.

BACKGROUND OF THE INVENTION

Software development may involve a development phase, in which software changes are designed and implemented, a user testing phase, in which software changes are subjected to various user tests, and a production phase, in which software changes are put into production after sufficient user testing. Software that is being developed, tested, and put into production may directly or indirectly interact with multiple computer systems, and each of these computer systems may be impacted by software changes. For example, certain computer systems may interact with remote database servers, and software changes on such computer systems may alter the performance of the database servers.

SUMMARY OF THE DISCLOSURE

In accordance with the present invention, certain disadvantages and problems associated with computer development assessments may be reduced or eliminated.

According to one embodiment, an apparatus evaluates a software change and includes an interface, a memory, and a processor. The interface is operable to communicate through a network with a mainframe and a database. The memory is operable to store metrics information. The processor is operable to determine that a job has executed on the mainframe, the job including a program on the mainframe that utilizes the software change and causes first database queries to be sent from the mainframe to the database. The processor is also operable to send a message identifying the job to the mainframe, receive job information associated with the first database queries from the mainframe, generate second database queries based on the job information, send the second database queries to the database, receive metrics associated with the first database queries, and determine whether the metrics information meets one or more compliance standards.

Certain embodiments of the invention may provide one or more technical advantages. A technical advantage of one embodiment may allow for more effective assessment of software changes during the software development process. Certain embodiments may also provide a more efficient and cost-effective mechanism for ensuring that certain standards are met before proceeding with subsequent development, testing, and/or release of software. For example, certain embodiments may provide automated locating and collection of metrics from multiple server regions, which may reduce the time and effort that may otherwise be required for manual review. Some embodiments may provide a dynamic analysis that allows for more flexible and/or streamlined software assessment. For example, certain embodiments may allow for faster and more precise collection of metrics for jobs that run concurrently on the same hardware with other users' jobs. Furthermore, some embodiments may provide improved automated review of software changes while streamlining subsequent review of the software changes by other users. For example, certain embodiments may reduce the likelihood that a non-compliant view is taking up extra system resources or that subsequent reviews are presented with erroneous, misleading, and/or improperly formatted metrics. As another example, certain embodiments may also increase subsequent reviewers confidence that the metrics have not been altered by enforcing certain locking and/or privacy requirements.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4, like numerals being used for like and corresponding parts of the various drawings.

In some embodiments, mainframe servers may interact with database servers to provide a distributed computer system. Software changes may be installed on mainframes, and these software changes may impact the performance of one or more aspects of the database servers. For example, software changes may affect one or more database queries made by a mainframe, which may impact the efficiency of database operations, the distribution of data in the database, or various other aspects of the database. When software is executing, various metrics may be captured in logs recorded by the mainframe and/or database. These metrics may be associated with a particular user who executed the software, for example, by running one or more "jobs." After a software change is executed, a software testing module may connect is to the mainframe to determine information about the jobs, and this information may enable the software testing module to generate database queries that can be sent to the database to retrieve metrics associated with the job. The software testing module may then determine whether the metrics meet one or more compliance standards.

Figure 1:
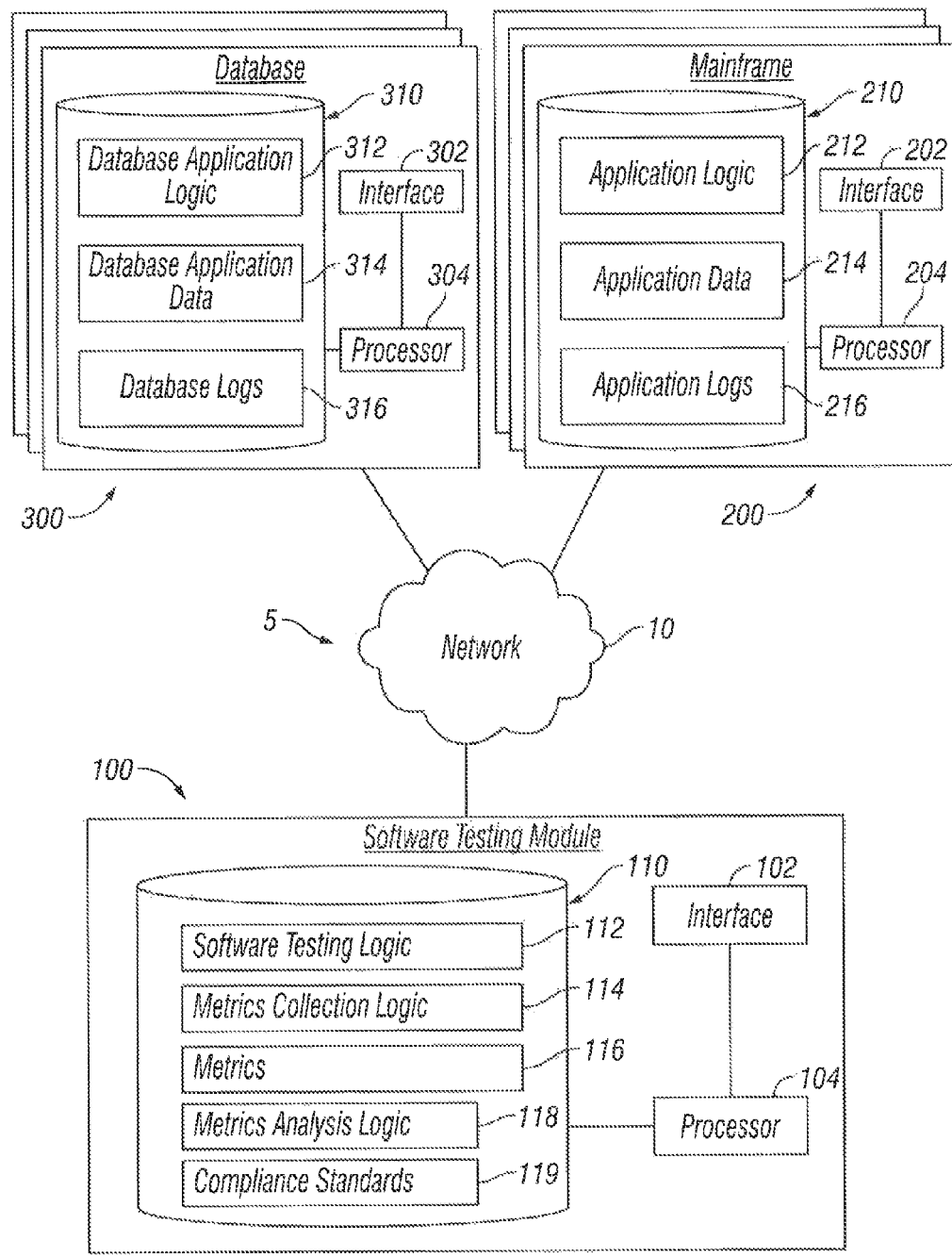
FIG. 1 illustrates an example system that facilitates software metrics assessment.

FIG. 1 illustrates an example system 5 that facilitates software assessment. System 5 includes software testing module 100, which communicates with mainframe 200 and database 300 through network 10 to analyze the impact of a software change on one or more components of system 5.

As used herein, the term "software change" refers to one or more pieces of new or changed software code. Software changes may include software that is designed and/or implemented from scratch; software "updates" that involve adding to, deleting, and/or modifying existing software; or any other type of software. Software encompasses source code, compiled code, or any other type of software, and software may be written in any software language and/or format. For example software changes may include database queries and/or other programs that run such queries. Software changes may apply to any part of the software development process including, but not limited to, a development phase, a user testing phase, and a production phase. Furthermore, reference to different phases of software development is not meant to imply that the tasks involved with various phases are mutually exclusive. For example, the user testing may occur during the development and/or production phases and on development and/or production platforms.

As used herein, the term "job" refers to one or more programs that include and/or interact with a software change. Jobs may involve isolated applications or applications that communicate with other applications and/or computer systems. For example, a job may involve running a program on software testing module 100 that communicates with an application executing on mainframe 200 and/or causing, mainframe 200 to send one or more queries to database 300. A job may be associated with a user who ran the job, and a job may have a start and end time. Jobs may also be associated with various logs that may be stored on software testing module 100, mainframe 200, database 300, and/or any suitable computer system.

Network 10 represents any suitable network operable to facilitate communication between the components of system 5. Network 10 may include any interconnecting system capable of transmitting audio, video, signals, data, messages, or any combination of the preceding. Network 10 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, any other suitable communication link, including combinations thereof operable to facilitate communication between the components.

Software testing module 100 represents any suitable components that facilitate the assessment of a software change in system 5. Software testing module 100 may include a network server, remote server, mainframe, host computer, workstation, web server, personal computer, file server, or any other suitable device operable to communicate with other devices and process data. In some embodiments, software testing module 100 may execute any suitable operating system such as IBM's zSeries/Operating System (z/OS), MS-DOS, PC-DOS, MAC-OS, WINDOWS, UNIX, OpenVMS, Linux or any other appropriate operating systems, including future operating systems. The functions of software testing module 100 may be performed by any suitable combination of one or more servers or other components at one or more locations. In the embodiment utilizing servers, the servers may be public or private servers. The server may include one or more servers at the same or at remote locations. Software testing module 100 may also include any suitable component that functions as any of the above components. For example, certain embodiments may utilize one or more virtual components, such as a virtual machine. In some embodiments, mainframe 200 and/or database 300 may be integrated with software testing module 100, or they may operate as part of the same device or devices.

In the illustrated embodiment, software testing module 100 includes network interface 102, processor 104, and memory 110.

Network interface 102 represents any suitable device operable to receive information from network 10, transmit information through network 10, perform suitable processing of the information, communicate to other devices, or any combination thereof. For example, network interface 102 may facilitate the running of one or more jobs by communicating with mainframe 200 and/or database 300. As another example, network interface 102 may facilitate the collection of metrics 116 associated with a job or software change by communicating with mainframe 200 and/or database 300. As another example, network interface 102 may communicate information to one or more display devices to facilitate user interaction with and review of one or more components of software testing module 100. Network interface 102 represents any port or connection, real or virtual, including any suitable hardware and/or software, including protocol conversion and data processing capabilities, to communicate through a LAN, WAN, or other communication system that allows software testing module 100 to exchange information with network 10, other software testing modules 100, mainframe 200, database 300, or other components of system 5.

Processor 104 communicatively couples to network interface 102 and memory 110 and controls the operation and administration of software testing module 100 by processing information received from network interface 102 and memory 110. Processor 104 includes any hardware and/or software that operates to control and process information. In some embodiments, processor 104 may be a programmable logic device, a microcontroller, a microprocessor, any suitable processing device, or any suitable combination of the preceding. Processor 104 may execute one or more sets of instructions to facilitate the assessment of a software change. For example, processor 104 may execute software testing logic 112 to facilitate the running of one or more jobs. Processor 104 may also execute metrics collection logic 114 to obtain various metrics 116 associated with such jobs. Processor 104 may also execute metrics analysis logic 118 to analyze metrics 116. Processor 104 may execute any other suitable programs to facilitate the assessment of computer change such as, for example, user interface software to present one or more GUIs to a user.

Memory 110 stores, either permanently or temporarily, data, operational software, or other information for processor 104, other components of software testing module 100, or other components of system 5. Memory 110 includes any one or a combination of volatile or nonvolatile local or remote devices suitable for storing information. For example, memory 110 may include random access memory (RAM), read only memory (ROM), flash memory, magnetic storage devices, optical storage devices, network storage devices, cloud storage devices, solid state devices, or any other suitable information storage device or a combination of these devices. Memory 110 may store information in one or more databases, file systems, tree structures, any other suitable storage system, or any combination thereof. Furthermore, different information stored in memory 110 may use any of these storage systems (e.g., software testing logic 112 may be stored in a file system while metrics 116 are stored in a relational database). Moreover, any information stored in memory may be encrypted or unencrypted, compressed or uncompressed, and static or editable. While illustrated as including particular modules, memory 110 may include any suitable information for use in the operation of software testing module 100. In the illustrated embodiment, memory 110 includes software testing logic 112, metrics collection logic 114, metrics 116, metrics analysis logic 118, and compliance standards 119.

Software testing logic 112 represents any suitable set of instructions, logic, or code embodied in a computer-readable storage medium and operable to facilitate execution of one or more software changes. Software testing logic 112 may be stored in memory 110 or another memory associated with software testing module 100. Software testing logic 112, or portions thereof, may also be embodied in hardware associated with software testing module 100 or other components of system 5. Furthermore, the components of software testing logic 112 may be stored in the same or different memories of the same or different software testing modules 100. Various components of software testing logic 112 may also be stored in different components of system 5. Software testing logic 112 may be implemented as an application, a component of an application, a plugin for an existing application, a script, an/or any suitable component.

In operation, software testing logic 112 may cause one or more jobs to be run by software testing system 100, mainframe 200, and/or database 300. Software testing logic 112 may communicate with mainframe 200 to cause one or more programs to be executed by mainframe 200. For example, software testing logic 112 may communicate with application logic 212 to cause mainframe 200 to run one or more jobs. Such jobs may cause mainframe 200 to send one or more queries to database 300, and logs related to such jobs and/or queries may be stored in application logs 216 as well as database logs 316. Furthermore, software testing logic 112 may be executed by different users from different software testing systems, which may result in multiple jobs run by different users and overlapping in time. Thus, concurrent execution of different instances of software testing logic 112 may lead to application logs 216 and database logs 316 containing logs that overlap in time and relate to jobs associated with different users.

Metrics collection logic 114 represents any suitable set of instructions, logic, or code embodied in a computer-readable storage medium and operable to facilitate the collection of metrics related to one or more software changes. Metrics collection logic 114 may be stored in memory 110 or another memory associated with software testing module 100. Metrics collection logic 114, or portions thereof, may also be embodied in hardware associated with software testing module 100 or other components of system 5. Furthermore, the components of metrics collection logic 114 may be stored in the same or different memories of the same or different software testing modules 100. Various components of metrics collection logic 114 may also be stored in different components of system 5. Metrics collection logic 114 may be implemented as an application, a component of an application, a plugin for an existing application, a script, and/or any suitable component. As a specific example, metrics collection logic 114 may be implemented as a macro in a spreadsheet program (such as, for example, EXCEL).

In operation, metrics collection logic 114 may communicate with mainframe 200 and database 300 to obtain metrics 116. As explained above, after one or more jobs have been run by mainframe 200 and/or database 300, mainframe 200 and database 300 may have various logs indicating the efficiency, accuracy, and/or other aspects of the job. Metrics collection logic 114 may obtain one or more portions of these logs from mainframe 200 and database 300. For example, metrics collection logic 114 may send a message to mainframe 200 identifying one or more jobs that were previously run. This message may be sent in response to input from a user, or it may be sent automatically following execution of software testing logic 112. The message may identify a job by, for example, including a software test identifier, a user identifier, a start time, an end time, a duration, and/or any suitable information that may allow mainframe 200 to identify one or more jobs.

In some embodiments, metrics collection logic 114 may select a particular mainframe 200 from multiple available mainframes 200 and/or a particular database 300 from multiple available databases 300. For example, mainframe 200 may include multiple versions, or "regions," handling different types of operation. As a specific example, mainframe 200 and database 300 may contain development, user testing, and production regions operating in parallel. Production regions may store and/or process real world data, while development and user testing regions may store and/or process simulated data to simulate real world operation. Metrics collection logic 114 may determine which region to use automatically, or it may select a region based on user input. In other embodiments, mainframe 200 and/or database 300 may include a single region, and selecting a region may not be necessary.

After sending the message to the appropriate mainframe 200, metrics collection logic 114 may receive a response from mainframe 200 that includes job information identifying one or more queries that were sent from mainframe 200 to database 300 during the one or more jobs. For example, the job information may include a user identifier, a start time, an end time, a duration, one or more query identifiers indicating which queries were sent to database 300 during the one or more jobs, a database identifier indicating which database 300 processed the queries, database log information indicating where the related logs can be accessed on the relevant database 300, and/or any suitable information that may allow software testing module 100 to obtain the relevant logs from database 300. Based on the job information, metrics collection logic may generate one or more queries to be sent to database 300. Software testing system 100 may therefore provide an efficient mechanism for locating, distinguishing, and retrieving database logs that can be used to evaluate a software change.

After sending the one or more queries to the appropriate database 300, metrics collection logic 114 may receive a response from database 300 including metrics information related to the one or more jobs. This metrics information, which may be stored as metrics 116, may indicate the efficiency, accuracy, and/or other aspects of one or more programs impacted by a software change. In some embodiments, the queries sent to database 300 may be tailored such that only metrics information related to the relevant jobs are returned. In other embodiments, metrics information unrelated to the relevant jobs may be returned as well, and metrics collection logic 114 may modify, delete, ignore, and/or otherwise process the metrics information to facilitate analysis of the relevant metrics information.

Metrics 116 include any suitable information indicating the efficiency, speed, accuracy, effectiveness, or any other suitable aspect of a software change or its impact on a computer system. In some embodiments, metrics 116 may indicate the performance of the software with respect to a particular computer system, such as database 300. For example, software changes may affect one or more database queries made by mainframe 200 to database 300, which may impact the efficiency of database operations, accuracy and/or distribution of data in the database, and/or various other aspects of database 300. Such metrics may include query performance metrics 120, table skew metrics 122, load metrics 124, and view metrics 126, which are discussed further below with respect to FIG. 2. Metrics 116 may include metrics information associated with one or more software changes, one or more jobs, and/or one or more users. Metrics 116 may provide a more efficient mechanism for evaluating the performance of a software change and/or determining whether a software change is compliant with one or more standards.

Metrics analysis logic 118 represents any suitable set of instructions, logic, or code embodied in a computer-readable storage medium and operable to facilitate the analysis of metrics related to one or more software changes, such as metrics 116. Metrics analysis logic 118 may be stored in memory 110 or another memory associated with software testing module 100. Metrics analysis logic 118, or portions thereof, may also be embodied in hardware associated with software testing module 100 or other components of system 5. Furthermore, the components of metrics analysis logic 118 may be stored in the same or different memories of the same or different software testing modules 100. Various components of metrics analysis logic 118 may also be stored in different components of system 5. Metrics analysis logic 118 may be implemented as an application, a component of an application, a plugin for an existing application, a script, and/or any suitable component. As a specific example, metrics analysis logic 118 may be implemented as a macro in a spreadsheet program (such as, for example, EXCEL).

In operation, metrics analysis logic 118 may determine whether one or more portions of metrics 116, and/or an associated software change, meet one or more compliance standards 119. For example, metrics analysis logic 118 may analyze compliance standards 119 related to query performance, table skew, load statistics, and/or database views. In some embodiments, metrics analysis logic 118 may dynamically determine which compliance standards 119 to evaluate and/or how to evaluate them. For example, certain standards or types of standards may be specifically selected for review or excluded from review based on one or more aspects of the software change and/or job being evaluated. As another example, the rubric used to evaluate a particular metric 116 may be adjusted based on one or more aspects of the associated job. As a specific example, a job that queries an extremely large table may be expected to run more slowly than a job that queries a small table, and metrics analysis logic 118 may adjust its assessment of the resulting metrics accordingly. Metrics analysis logic 118 may therefore provide a dynamic analysis that allows for more flexible and/or streamlined software assessment.

Based on the analysis of metrics 116, metrics analysis logic 118 may determine that a software change or a job is compliant or noncompliant. In some embodiments, compliance or noncompliance may be granular such that different metrics may be identified as compliant or noncompliant. Furthermore, compliance may be evaluated using any appropriate scale. For example, compliance may be binary such that metrics analysis logic 118 identifies a software change or a job as either compliant or noncompliant, or compliance may be evaluated along a scale or any other suitable rubric. Other embodiments may utilize a 0-10 scale, a pass-fail scale, a color-coded scale, any other scale suitable for compliance scoring, or any combination thereof. Once the compliance analysis has been performed, it may be presented to a user in any suitable manner. For example, compliance scores may be reported on a spreadsheet, presented via a GUI on a display device connected to software testing system 10, communicated via email or other suitable alerts, or presented in any other suitable manner. The analysis may also be presented to one or more users for subsequent evaluation. For example, users may review the compliance analysis to ensure its accuracy, override one or more portions of its analysis, and/or perform additional analyses. Reporting the compliance analysis in this manner may allow software testing, module 100 to efficiently provide automated review of software changes while streamlining subsequent review of the metrics and/or the metrics analysis by users.

Compliance standards 119 represent any suitable standard for evaluating one or more aspects of metrics 116. For example, compliance standards 119 may include standards related to query performance (e.g., whether a job meets a certain level of efficiency), table skew (e.g., whether a job results in a sufficiently even distribution of data across various tables of database 300), load statistics (e.g., whether job timing, the volume of data handled, and/or the database utilities used during the job are acceptable), and/or database views (e.g., whether the formatting, parameters, and/or meta data associated with database views are correct). These standards may provide an efficient mechanism for automatically assessing the performance of a software change across a broad range of factors. Compliance standards 119 are discussed further below with respect to FIG. 3.

Mainframe 200 represents any suitable components that are operable to run applications and communicate with software testing system 100 and database 300 through network 10. Mainframe 200 may include a network server, remote server, mainframe, host computer, workstation, web server, personal computer, file server, or any other suitable device operable to communicate with other devices and process data. In some embodiments, mainframe 200 may execute any suitable operating system such as IBM's zSeries/Operating System (z/OS), MS-DOS, PC-DOS, MAC-OS, WINDOWS, UNIX, OpenVMS. Linux or any other appropriate operating systems, including future operating systems. The functions of mainframe 200 may be performed by any suitable combination of one or more servers or other components at one or more locations. In the embodiment where the modules are servers, the servers may be public or private servers, and each server may be a virtual or physical server. The server may include one or more servers at the same or at remote locations. For example, mainframe 200 may operate logically as a single server while operating across two or more physical servers. Mainframe 200 may also include any suitable component that functions as a server. In some embodiments, one or more portions of software testing module 100 and/or database 300 may be integrated with mainframe 200, or they may operate as part of the same device or devices.

In some embodiments, mainframe 200 may include multiple versions or regions handling different types of operation. As a specific example, mainframe 200 may contain development, user testing, and production regions operating in parallel. Production regions may store and/or process real world data, while development and user testing regions may store and/or process simulated data to simulate real world operation. Other embodiments may not include multiple regions. Different versions of mainframe 200 may operate on the same or different physical and/or virtual machines. In some embodiments, a particular region of mainframe 200 may communicate with a particular region of database 300. For example, a user testing region of mainframe 200 may utilize a user testing region of database 300 and vice versa. Furthermore, in some embodiments a single region of mainframe 200 may be operable to utilize multiple regions of database 300, and in some embodiments multiple regions of mainframe 200 may be operable to utilize a single region of database 300. In embodiments having multiple regions, a particular region of mainframe 200 may be selected automatically by software testing system 100 based on one or more parameters, or a user may select the region explicitly via user input. Providing access to multiple regions of mainframe 200 via a single software testing system 100 may provide simplified and/or streamlined access to different software testing environments.

In the illustrated embodiment, mainframe 200 includes network interface 202, processor 204, and memory 210.

Network interface 202 represents any suitable device operable to receive information from network 10, transmit information through network 10, perform suitable processing of the information, communicate to other devices, or any combination thereof. For example, network interface 202 may facilitate the communication of one or more portions of application logs 216 to software testing module 100. Network interface 202 may also receive information from other computer systems, such as software testing module 100 or database 300. Network interface 202 represents any port or connection, real or virtual, including any suitable hardware and/or software, including protocol conversion and data processing capabilities, to communicate through a LAN, WAN, or other communication system that allows mainframe 200 to exchange information with network 10, software testing module 100, other project modules 200, database 300, or other components of system 5.

Processor 204 communicatively couples to network interface 202 and memory 210, and controls the operation and administration of mainframe 200 by processing information received from network interface 202 and memory 210. Processor 204 includes any hardware and/or software that operates to control and process information. For example, processor 204 may execute application logic 212 to execute various applications and communicate with software testing module 100 and database 300. Processor 204 may be a programmable logic device, a microcontroller, a microprocessor, any suitable processing device, or any suitable combination of the preceding.

Memory 210 stores, either permanently or temporarily, data, operational software, or other information for processor 204, other components of mainframe 200, or other components of system 5. Memory 210 may include any component discussed above regarding memory 110. Memory 210 may store information in one or more databases, file systems, tree structures, any other suitable storage system, or any combination thereof. Furthermore, different information stored in memory 210 may use different types of storage systems. Moreover, any information stored in memory may be encrypted or unencrypted, compressed or uncompressed, and static or editable. While illustrated as including particular modules, memory 210 may include any suitable information for use in the operation of mainframe 200. In the illustrated embodiment, memory 210 includes application logic 212, application data 214, and application logs 216.

Application logic 212 represents any suitable set of instructions, logic, or code embodied in a computer-readable storage medium and operable to facilitate the execution of one or more applications. Application logic 212 may be stored in memory 110 or another memory associated with mainframe 200. Application logic 212, or portions thereof, may also be embodied in hardware associated with software testing module 100 or other components of system 5. Furthermore, the components of application logic 212 may be stored in the same or different memories of the same or different mainframes 200. Various components of application logic 212 may also be stored in different components of system 5.

In operation, application logic 212 implements one or more applications running mainframe 200. Application logic 212 may consist of multiple applications. For example, application logic 212 may include applications that communicate with database 300 to store, access, search, or otherwise use one or more portions of database application data 314. Data received from database 300 or otherwise accessed by mainframe 200 may be stored as application data 214. One or more applications may receive one or more messages from software testing logic 112. Such messages may trigger the running of one or more jobs, which may involve sending one or more queries to database 300. Information associated with such jobs may be stored in application logs 216.

Application data 214 includes any suitable information that may be stored, accessed by, or processed by one or more applications in application logic 212. Application data 214 may include application state, data received from database 300 or software testing module 100, or any suitable data. For example, during the normal operation of mainframe 200, application logic 212 may query database 300 to retrieve information that may then be stored, permanently or temporarily, as application data 214.

Application logs 216 include any suitable information operable to facilitate collection of metrics related to one or more jobs from database 300 by software testing system 100. Application logs may also include any logs stored during the operation of application logic 210. For example, when application logic 212 runs a job, information about the job may be stored in application logs 216. Such information may include a user identifier of the user who ran the job, a start time of the job, an end time job, a duration of the job, one or more query identifiers indicating which queries were sent to database 300 during the job, a database identifier indicating which database 300 processed the queries, database log information indicating where the related logs can be accessed on the relevant database 300, and/or any suitable information that may allow software testing module 100 to obtain the relevant logs from database 300. Metrics collection logic 114 may send one or more messages requesting one or more portions of application logs 216, and application logic 212 may analyze application logs 216 to identify and return the relevant job information. This job information may allow software testing module 100 to query database 300 to obtain metrics related to the job.

Database 300 represents any suitable components that maintain information and perform processing relating to applications. Database 300 may include a network server, remote server, mainframe, host computer, workstation, web server, personal computer, file server, or any other suitable device operable to communicate with other devices and process data. In some embodiments, database 300 may execute any suitable operating system such as IBM's zSeries/Operating System (z/OS), MS-DOS, PC-DOS, MAC-OS, WINDOWS, UNIX, OpenVMS, Linux or any other appropriate operating systems, including future operating systems. In certain embodiments, database 300 may be a dedicated database server. For example, in a particular embodiment, database 300 may be a TERADATA server. The functions of database 300 may be performed by any suitable combination of one or more servers or other components at one or more locations. In the embodiment where the modules are servers, the servers may be public or private servers, and each server may be a virtual or physical server. The server may include one or more servers at the same or at remote locations. For example, database 300 may operate logically as a single server while operating across two or more physical servers. Database 300 may also include any suitable component that functions as a server. In some embodiments, software testing module 100 and/or mainframe 200 may be integrated with database 300, or they may operate as part of the same device or devices.

In the illustrated embodiment, database 300 includes network interface 302, processor 304, and memory 310.

Network interface 302 represents any suitable device operable to receive information from network 10, transmit information through network 10, perform suitable processing of the information, communicate to other devices, or any combination thereof. For example, network interface 302 may facilitate the communication of one or more portions of database application data 314 to mainframe 200 and may facilitate the communication of one or more portions of database logs 316 to software testing module 100. Network interface 302 may also receive information from other computer systems, such as software testing module 100 or mainframe 200. Network interface 302 represents any port or connection, real or virtual, including any suitable hardware and/or software, including protocol conversion and data processing capabilities, to communicate through a LAN, WAN, or other communication system that allows database 300 to exchange information with network 10, software testing module 100, mainframe 200, other application modules 300, or other components of system 5.

Processor 304 communicatively couples to network interface 302 and memory 310, and controls the operation and administration of database 300 by processing information received from network interface 302 and memory 310. Processor 304 includes any hardware and/or software that operates to control and process information. For example, processor 304 may execute database application logic to facilitate the communication with software testing module 100 and/or mainframe 200 as described above. Processor 304 may be a programmable logic device, a microcontroller, a microprocessor, any suitable processing device, or any suitable combination of the preceding.

Memory 310 stores, either permanently or temporarily, data, operational software, or other information for processor 304, other components of database 300, or other components of system 5. Memory 310 may include any component discussed above regarding memory 110. Memory 310 may store information in one or more databases, file systems, tree structures, any other suitable storage system, or any combination thereof. Furthermore, different information stored in memory 310 may use different types of storage systems. Moreover, any information stored in memory may be encrypted or unencrypted, compressed or uncompressed, and static or editable. While illustrated as including particular modules, memory 310 may include any suitable information for use in the operation of database 300. In the illustrated embodiment, memory 310 includes database application logic 312, database application data 314, and database logs 316.

Database application logic 312 represents any suitable set of instructions, logic, or code embodied in a computer-readable storage medium and operable to perform database functions. Database application logic 312 may be stored in memory 110 or another memory associated with database 300. Database application logic 312, or portions thereof, may also be embodied in hardware associated with software testing module 100 or other components of system 5. Furthermore, the components of database application logic 312 may be stored in the same or different memories of the same or different databases 300. Various components of database application logic 312 may also be stored in different components of system 5.

In operation, database application logic 312 facilitates various database operations. For example, database application logic may handle queries received from software testing module 100 and mainframe 200. Database application logic 312 may also be operable to store information in data application data 314 and store metrics and other log information in database logs 316. Furthermore, database application logic 312 may receive one or more messages from metrics collection logic 114 requesting one or more portions of database application data 314 and/or database logs 316, and database application logic 312 may identify and return such information.

Database application data 314 includes any suitable information that may be stored, accessed by, or processed by database application logic 212. Database application data 314 may include data used by one or more applications of application logic 212. As a specific example, database application data 314 may include various tables that can be accessed and updated by mainframe 200 and/or software testing module 100. For example, database application logic 312 may receive one or more queries from mainframe 200 related to one or more jobs. In processing such queries, database application logic 312 may add, delete, modify, and/or otherwise affect database application data 314. Logs associated with such queries may be stored in database logs 316.

Database logs 316 include any suitable information related to the operations of database 300 during a job. Such information may include information related to one or more jobs that may be retrieved as part of a metrics collection process by software testing system 100. For example, when application logic 212 runs a job, information about the job may be stored in application logs 216. Such information may include information related to query performance, table skew, load statistics, and/or database views. Metrics collection logic 114 may send one or more messages requesting one or more portions of this information, and database application logic 312 may analyze database logs 316 to identify and return the relevant metrics. Database logs 316 may therefore provide raw data that can be analyzed to determine whether a software change meets one or more compliance standards 119.

In an exemplary embodiment of operation, software testing module 100 may initiate execution of a software change by sending a request to mainframe 200 to run a job. The job may involve mainframe 200 sending one or more queries to database 300, and mainframe 200 and database 300 may store logs associated with the job in application logs 216 and database logs 316, respectively. Software testing module 100 may then send a request to mainframe 200 for job information associated with the job, and mainframe 200 may respond with the relevant portions of application logs 216. Based on this job information, software testing module 100 may generate one or more queries and send these queries to database 300, and database 300 may respond with one or more portions of database logs 316 that are associated with the job. Software testing module 100 may store one or more portions of this information as metrics 116. Software testing module 100 may also determine whether one or more portions of metrics 116 are compliant with one or more compliance standards 119. Such analysis may be used to evaluate the metrics themselves and/or the software change or job that resulted in the generation of metrics 116. If metrics 116 are determined not to be in compliance, one or more error messages may be generated and communicated to a user. In some embodiments, once compliance standards 119 have been evaluated, and metrics 116 are determined to be in compliance, metrics 116 may be communicated to another user for additional manual analysis.

Modifications, additions, or omissions may be made to system 5 without departing from the scope of the invention. For example, system 5 may implement computer assessment procedures different from or in addition to those described herein. As another example, multiple software testing modules 100 may operate in parallel to facilitate standards compliance. As yet another example, software testing logic 112 may be configurable by a user of software testing module 100, which may facilitate the modification of existing rules, deletion of existing rules, or insertion of additional rules. System 5 may include any number of networks 10, software testing modules 100, project modules 200, and application modules 300. Any suitable logic may perform the functions of system 5 and the components within system 5.

Figure 2:
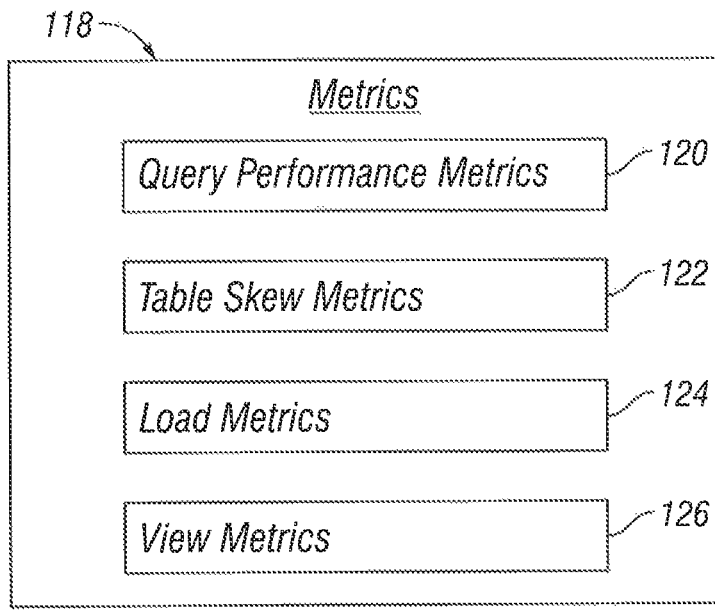
FIG. 2 illustrates example metrics that may be used to facilitate the evaluation of a software change.
Figure 3:
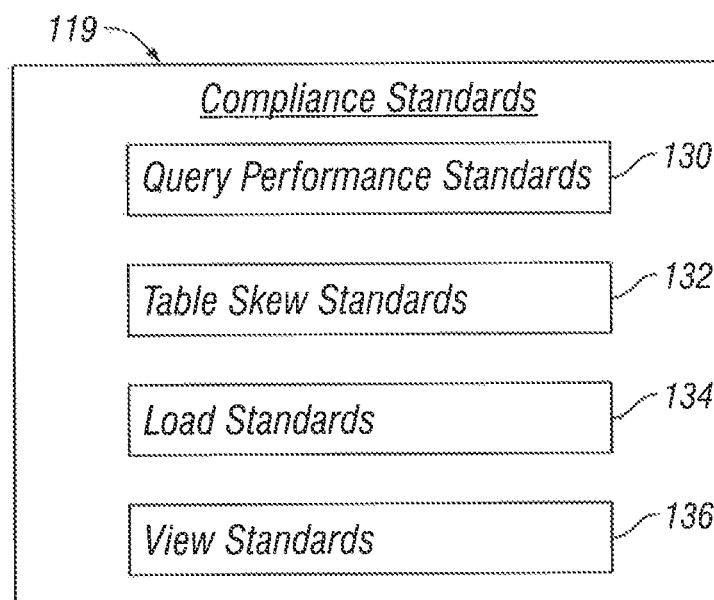
FIG. 3 illustrates example compliance standards that may be utilized during software metrics assessment.

FIG. 2 illustrates example metrics 116 that may be used to facilitate the evaluation of a software change. FIG. 3 illustrates example compliance standards 119 that may be evaluated during software assessment. Metrics 116 may be evaluated against corresponding compliance standards 119. In the illustrated embodiments, metrics 116 include query performance metrics 120, table skew metrics 122, load metrics 124, and view metrics 126. Similarly, compliance standards 119 include query performance standards 130, table skew standards 132, load standards 134, and view standards 136.

Query performance metrics 120 may include any suitable data indicating the efficiency of a job. Such metrics may indicate the impact of a job on the performance of database 300. For example, a query (e.g., a query made by mainframe 200 during the job) that is not sufficiently tuned may result in higher CPU and/or other resource utilization by database 300. Data that might be retrieved from database 300 and included in query performance metrics 120 includes a user identifier of the user that ran the query, the application of mainframe 200 that was used to submit the query, a query identifier that identifies which query was run, the text of the query itself, start and end times, the duration of the query, the number of rows returned in the result set, the amount of time processor 304 was used for the query, and/or the amount of IO used for the query. Data may also include other CPU and IO information, the amount of spool used by the query, the number of virtual processors used by database 300 (e.g., the number of Access Module Processors ("AMPs") in a TERADATA system), and/or any other suitable information. Metrics analysis logic 118 may use such data to determine whether a software change or a job is compliant with one or more query performance standards 130. For example, query performance standards 130 may indicate that a particular type of query should not exceed a certain level of CPU and/or IO usage.

Table skew metrics 122 may include any suitable data indicating the effect of a job on the distribution of one or more tables in database 300. These metrics may indicate how database application data 314 is distributed across various nodes of database 300. Table skew metrics 122 may include data such as the table name, the database name where the table is located, the amount of space the table is using, information indicating how the table size compares to other table sizes, and/or various counts associated with the table (e.g., counts for the number of referential integrity rules are active on the table, the number of active constraints on the table, the number of triggers on the table, the number of columns on the table, and/or the number of unused columns on the table). Table skew metrics 122 may also include information indicating the type of the primary index, the number and/or cardinality of the secondary indexes, whether or not the table is compliant with various skewing standards, the number of virtual processors operating on database 300, and/or any other suitable information. Metrics analysis logic 118 may use such data to determine whether a software change or a job is compliant with one or more table skew standards 132. For example, evaluating table skew metrics 122 based on table skew standards 132 may indicate that a particular table impacted by a job is non-compliant. As another example, table skew standards 132 may be used to evaluate whether a job results in tables with data that is distributed too unevenly.

Load metrics 124 may include any suitable data related to the job itself and its interaction with database 300. Load metrics 124 may also provide information about a process of database 300 that was used to handle the job. For example, load metrics may include data such as the name of the job or a subpart of the job, a session identifier, start times and/or end times of the process, elapsed times required for running of the process or a particular portion of the process, the number of records input and/or output by a process, the total impact of the job or process on the CPU and/or I/O operations of database 300, a percentage of the total or expected volume of data that was processed during the job, and/or the number of virtual processors in database 300. Load metrics 124 may also indicate the type of process or utility used by database 300 to handle the job. For example, in embodiments utilizing a TERADATA server, the types of processes may include MLOAD, FastLoad, BTEQ, FastExport, TPT, or other suitable process types. Evaluation of load metrics 124 based on load standards 134 may allow software testing module 100 to determine whether a job is efficiently handling database utilities. As a specific example, load standards 134 may suggest that a job is non-compliant if the job utilized a database utility other than a prescribed utility given the volume of data processed.

View metrics 126 may include any suitable information associated with the formatting, parameters, and/or metadata of a view. A view is an image of data contained in a table that is created over top of the table. A view may be a result set of a query and may therefore include all, some, or none of the items in a table or database. The view reflected in view metrics 126 may be a view of metrics 116. For example, one or more portions of metrics 116 may be generated by sending one or more queries to database 300, and the view may be the result of such queries. View metrics 126 may therefore include metadata about metrics 116. View metrics 126 may be evaluated against view standards 136 to ensure that views are formed in a particular way. View standards 136 may also ensure that privacy settings and locks are set as prescribed. View metrics 126 may include data such as the database name where the view is housed, the name of the view, the name of one or more views related the view, a number of virtual processors in database 300, and/or information indicating one or more parameters of the view. Such information may indicate whether the view is using a replace command, whether one more rows of the view are locked, whether a union operator was used in the query that formed the view, whether the view is performing a full outer join, and/or whether the view complies with a privacy policy. View metrics 126 and view standards 136 may provide improved software metrics analysis by reducing the likelihood that a non-compliant view is taking up extra system resources. Embodiments that enforce locking and/or privacy requirements may also provide improved software metrics analysis by increasing reviewers' confidence that metrics 116 have not been altered.

Figure 4:
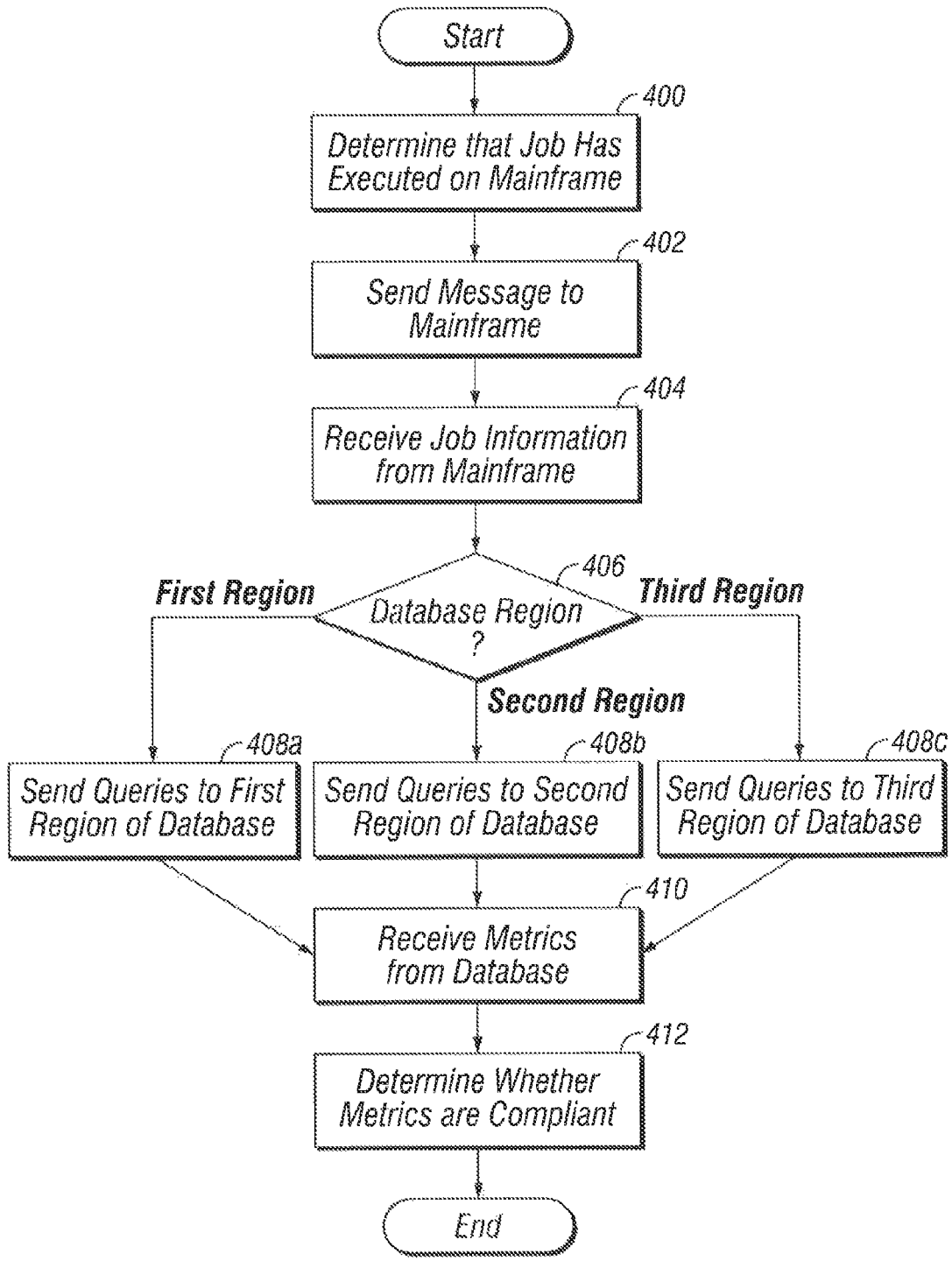
FIG. 4 illustrates an example software metrics assessment sequence.

FIG. 4 is a diagram that illustrates an example software metrics analysis sequence of software testing module 100.

At step 400, software testing module 100 determines that a job has executed on mainframe 200. This determination may occur automatically following the execution of the job. For example, a user of software testing module 100 may initiate the job, and software testing module 100 may be configured to automatically determine when the job is complete to trigger subsequent metrics analysis. This determination does not necessarily require that the job be complete or that software testing module 100 make an explicit determination. For example, in embodiments where software testing module 100 does not automatically proceed to step 402 after initiating the job, a user may provide input to software testing module 100 causing the sequence to proceed to step 402. In some embodiments, this step may be omitted entirely. Following the determination, the sequence proceeds to step 402.

At step 402, software testing module 100 sends a first message to mainframe 200 to request information that will allow it to build one or more database queries to retrieve metrics related to the job from database 300. The first message may contain information identifying the job such as, for example, a user identifier, a start time, an end time, a duration, a job identifier, or any other suitable information that may allow mainframe 200 to determine which job is being sought. Based on this information, mainframe 200 may retrieve job-related information from application logs 216. Furthermore, in some embodiments, software testing module 100 may select a particular version or region of mainframe 200. For example, mainframe 200 may have a development region, a testing region, a production region, and/or any other suitable region. In such embodiments, the selection may be made by a user, or the selection may occur automatically based on one or more factors such as, for example, the region of mainframe 200 on which the job was previously run.

At step 404, software testing module 100 receives a response from mainframe 200. This response may include job information associated with one or more first database queries that were previously sent from mainframe 200 to database 300 as part of the job. This job information may include a user identifier, a start time, an end time, a duration, a job identifier, a query type, query text, a database name, a table name, or any other suitable information that will enable software testing module to generate database queries. After receiving this response from mainframe 200, software testing module 100 proceeds to step 406.

At step 406, software testing module 100 may determine which version or region of database 300 to use. Some embodiments may not utilize multiple regions of database 300, and in such embodiments, step 406 may be omitted. In other embodiments, software testing module 100 may select the appropriate region based on various factors. For example, mainframe 200 may provide information indicating which database region it used during the running of the job. As another example, in embodiments where a user selects which the region in which to run the job initially, software testing module 100 may store region information to properly direct subsequent metrics queries. In the illustrated embodiment, database 300 is shown to have three regions, but other embodiments may use any suitable number of regions. For example, various embodiments may utilize one, two, three, five, ten, or any suitable number of regions. In the illustrated example with three regions, if software testing module 100 determines that the appropriate region is the first, second, or third, it proceeds to steps 408a, 408b, or 408c, respectively.

At steps 408a-c, software testing module 100 generates and sends database queries to the appropriate region of database 300 to obtain metrics information regarding the job. These queries may be generated based on the job information received from mainframe 200 during step 404. For example, the job information may indicate that particular queries were previously sent with a particular user identifier and a particular time. Based on this information, software testing module 100 may automatically generate one or more database queries that are constructed to retrieve metrics information from database 300 related to the previously sent queries. After generating and sending the database queries to the appropriate region of database 300, software testing module 100 may proceed to step 410.

At step 410, software testing module 100 receives a response to the database queries sent during step 408. This response may contain metrics information that was retrieved by database 300 from database logs 316. This information may include any type of information discussed above with respect to metrics 116 in FIG. 1 or 2, in some embodiments, metrics 116 may be presented to a user via any suitable mechanism. For example, metrics 116 may be presented in a spreadsheet that is organized to present various categories of information. Upon receiving the metrics information from database 300, software testing module 100 may proceed to step 412.

At step 412, software testing module 100 determines whether one or more portions of metrics 16 are compliant with one or more compliance standards 119. Compliance may be determined as discussed above with respect to FIGS. 2 and 3. Various embodiments may evaluate compliance of metrics 116 differently. For example, some embodiments may determine the formatting of metrics 116 (for example, data presented in a spreadsheet) is compliant to automatically detect errors before sending metrics 116 to another computer system or another user for review. Other embodiments may analyze metrics 116 to assess substantive as well as formal compliance. For example, software testing module 100 may automatically evaluate the efficiency, accuracy, and/or other aspects of a job's performance. By providing automatic assessment of metrics 116, software testing module 100 may provide faster, more reliable, and more thorough analysis of software changes.

Various embodiments may perform some, all, or none of the steps described above. For example, certain embodiments may omit steps 400, 406, and/or 412 under certain conditions, or they may omit these steps entirely. Furthermore, certain embodiments may perform these steps in different orders or in parallel. Moreover, one or more steps may be repeated. For example, this sequence may be performed once during the design phase of the software change and then performed again during the build phase of the software change. While discussed as software testing module 100 performing these steps, any suitable component of system 5 may perform one or more steps of the method.

Herein, "or" is inclusive and not exclusive, unless expressly indicated otherwise or indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, "A and B" means "A and B, joint or severally," unless expressly indicated otherwise or indicated otherwise by context.

Particular embodiments may be implemented as hardware, software, or a combination of hardware and software. As an example and not by way of limitation, one or more computer systems may execute particular logic or software to perform one or more steps of one or more processes described or illustrated herein. Software implementing particular embodiments may be written in any suitable programming language (which may be procedural or object oriented) or combination of programming languages, where appropriate. In various embodiments, software may be stored in computer-readable storage media. Any suitable type of computer system (such as a single- or multiple-processor computer system) or systems may execute software implementing particular embodiments, where appropriate. A general-purpose computer system may execute software implementing particular embodiments, where appropriate. In certain embodiments, portions of logic may be transmitted and or received by a component during the implementation of one or more functions.

Herein, reference to a computer-readable storage medium encompasses one or more non-transitory, tangible, computer readable storage medium possessing structures. As an example and not by way of limitation, a computer-readable storage medium may include a semiconductor-based or other integrated circuit (IC) (such as, for example, an FPGA or an application-specific IC (ASIC)), a hard disk, an HDD, a hybrid hard drive (HHD), an optical disc, an optical disc drive (ODD), a magneto-optical disc, a magneto-medium, a solid-state drive (SSD), a RAM-drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of interface 102, one or more portions of processor 104, one or more portions of memory 110, or a combination of these, where appropriate. Analogous portions of mainframe 200 and database 300 may also be configured in this manner. In particular embodiments, a computer-readable storage medium implements RAM or ROM. In particular embodiments, a computer-readable storage medium implements volatile or persistent memory.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. For example, various embodiments may perform all, some, or none of the steps described above. Various embodiments may also perform the functions described in various orders.

Various embodiments disclosed herein may be used together in a variety of combinations. In various embodiments, software testing module 100 may have different types, numbers, and configurations of interface 102, processor 104, memory 110, or any components thereof (analogous portions of mainframe 200 and database 300 may also be configured in this manner). For example, various embodiments may utilize different numbers and types of metrics 116.

Although the present invention has been described above in connection with several embodiments; changes, substitutions, variations, alterations, transformations, and modifications may be suggested to one skilled in the art, and it is intended that the present invention encompass such changes, substitutions, variations, alterations, transformations, and modifications as fall within the spirit and scope of the appended claims.

What is claimed is:

1. A method of evaluating a software change, the method comprising:
   determining, by a first computer system, that a first job has executed on a mainframe, the first job comprising one or more programs on the mainframe that utilize the software change and cause one or more first database queries to be sent from the mainframe to a database;
   sending, by the first computer system to the mainframe, a first message identifying the first job;
   receiving, by the first computer system from the mainframe in response to the first message, job information associated with the one or more first database queries;
   generating, by the first computer system based on the job information, one or more second database queries associated with the first job;
   sending, by the first computer system to the database, the one or more second database queries;
   receiving, by the first computer system from the database in response to the one or more second database queries, metrics information associated with the one or more first database queries; and
   determining, by the first computer system, whether the metrics information meets one or more compliance standards.

2. The method of claim 1, wherein the metrics information comprises query performance metrics indicating resource utilization by the database during processing of the first database queries by the database.

3. The method of claim 2, wherein the metrics information further comprises one or more of the following:
   table skew metrics indicating distribution of data in one or more tables of the database;
   load metrics associated with a volume of data processed by the database during the first job; and
   view metrics comprising one or more parameters associated with a view received by the first computer system from the database in response to the one or more second database queries, wherein the view comprises the metrics information.

4. The method of claim 1, further comprising:
   determining a mainframe version from a plurality of mainframe versions, and determining a database version from the plurality of mainframe versions, wherein sending the first message to the mainframe comprises sending the first message to the mainframe version, and sending the one or more second database queries to the database comprises sending the one or more second database queries to the database version.

5. The method of claim 4, wherein:
   the plurality of mainframe versions comprises:
      a software development version;
      a testing version; and
      a production version; and
   the plurality of databases versions comprises:
      a software development version;
      a testing version; and
      a production version.

6. The method of claim 1, wherein the job information comprises job timing information indicating start and end times associated with the first job.

7. The method of claim 1, wherein:
   the metrics information comprises metrics information associated with the first job and metrics information associated with a second job; and
   the method further comprises deleting, by the first computer system before determining whether the metrics information meets the one or more compliance standards, the metrics information associated with the second job.

8. An apparatus for evaluating a software change, comprising:

an interface operable to communicate through a network with a mainframe and a database;

a memory operable to store metrics information; and a processor communicatively coupled to the interface and the memory, the processor operable to:

determine that a first job has executed on the mainframe, the first job comprising one or more programs on the mainframe that utilize the software change and causes one or more first database queries to be sent from the mainframe to the database;

send a first message identifying the first job to the mainframe;

receive job information associated with the one or more first database queries from the mainframe in response to the first message;

generate one or more second database queries associated with the first job based on the job information;

send the one or more second database queries to the database;

receive metrics information associated with the one or more first database queries from the database in response to the one or more second database queries; and determine whether the metrics information meets one or more compliance standards.

9. The apparatus of claim 8, wherein the metrics information comprises query performance metrics indicating resource utilization by the database during processing of the first database queries by the database.

10. The apparatus of claim 9, wherein the metrics information further comprises one or more of the following:

table skew metrics indicating distribution of data in one or more tables of the database;

load metrics associated with a volume of data processed by the database during the first job; and view metrics comprising one or more parameters associated with a view received by the first computer system from the database in response to the one or more second database queries, wherein the view comprises the metrics information.

11. The apparatus of claim 8, wherein the processor is further operable to determine a mainframe version from a plurality of mainframe versions and to determine a database version from the plurality of mainframe versions, and wherein sending the first message to the mainframe comprises sending the first message to the mainframe version, and sending the one or more second database queries to the database comprises sending the one or more second database queries to the database version.

12. The apparatus of claim 11, wherein:

the plurality of mainframe versions comprises:
   a software development version;
   a testing version; and
   a production version; and the plurality of databases versions comprises:
   a software development version;
   a testing version; and
   a production version.

13. The apparatus of claim 8, wherein the job information comprises job timing information indicating start and end times associated with the first job.

14. The apparatus of claim 8, wherein:

the metrics information comprises metrics information associated with the first job and metrics information associated with a second job; and the processor is further operable to delete the metrics information associated with the second job before determining whether the metrics information meets the one or more compliance standards.

15. A non-transitory computer readable storage medium comprising logic, the logic operable, when executed by a processor, to:

determine that a first job has executed on a mainframe, the first job comprising one or more programs on the mainframe that utilize the software change and causes one or more first database queries to be sent from the mainframe to a database;

send a first message identifying the first job to the mainframe;

receive job information associated with the one or more first database queries from the mainframe in response to the first message;

generate one or more second database queries associated with the first job based on the job information;

send the one or more second database queries to the database;

receive metrics information associated with the one or more first database queries from the database in response to the one or more second database queries; and determine whether the metrics information meets one or more compliance standards.

16. The medium of claim 15, wherein the metrics information comprises query performance metrics indicating resource utilization by the database during processing of the first database queries by the database.

17. The medium of claim 16, wherein the metrics information further comprises one or more of the following:

table skew metrics indicating distribution of data in one or more tables of the database;

load metrics associated with a volume of data processed by the database during the first job; and view metrics comprising one or more parameters associated with a view received by the first computer system from the database in response to the one or more second database queries, wherein the view comprises the metrics information.

18. The medium of claim 15, wherein the logic is further operable, when executed by the processor, to determine a mainframe version from a plurality of mainframe versions and to determine a database version from the plurality of mainframe versions, and wherein sending the first message to the mainframe comprises sending the first message to the mainframe version, and sending the one or more second database queries to the database comprises sending the one or more second database queries to the database version.

19. The medium of claim 18, wherein:

the plurality of mainframe versions comprises:

a software development version;

a testing version; and a production version; and the plurality of databases versions comprises:

a software development version;

a testing version; and a production version.

20. The medium of claim 18, wherein the job information comprises job timing information indicating start and end times associated with the first job.

* * * * *